(12) United States Patent
Yussouff et al.

(10) Patent No.: US 8,392,984 B2
(45) Date of Patent: *Mar. 5, 2013

(54) PROVISIONING/CONFIGURATION SYSTEMS FOR VPN TO VPN BRIDGING FOR IP VIDEO CONFERENCING

(75) Inventors: Ashraf Yussouff, Wesley Chapel, FL (US); Nitin Anant Bhanap, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/987,323

(22) Filed: Jan. 10, 2011

(65) Prior Publication Data

US 2012/0180121 A1 Jul. 12, 2012

(51) Int. Cl.
*H04L 12/18* (2006.01)
*G06F 13/14* (2006.01)

(52) U.S. Cl. ............ 726/15; 713/151; 713/153; 380/212
(58) Field of Classification Search .................. None
See application file for complete search history.

(56) References Cited

PUBLICATIONS

Providing dynamic VPN service for B2B. Karp. 2002.*

* cited by examiner

*Primary Examiner* — Venkat Perungavoor

(57) ABSTRACT

Internet Protocol (IP) video conferencing bridging provisioning/configuration systems receive a service order associated with a customer, where the service order requests enrollment of the customer in a Virtual Private Network (VPN) to VPN bridging network service for IP video conferencing. The provisioning/configuration systems orchestrate, based on the service order, configuration of multiple network nodes in a network that provides the VPN to VPN bridging network service for IP video conferencing to the customer to enable IP video conferencing calls to be made from the customer via the network to another customer on a different VPN.

15 Claims, 7 Drawing Sheets

PROVISIONING/CONFIGURATION SYSTEMS FOR VPN TO VPN BRIDGING FOR IP VIDEO CONFERENCING

BACKGROUND

Video conferencing systems permit the communication of video and audio between at least two participants of a video conference. Such video conferences have increasingly been used to allow long distance parties to participate in educational courses, business meetings, family "get-togethers," and other applications where both video and audio are desirable to the participants.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a network implements Virtual Private Network (VPN) to VPN bridging for IP video conferencing for customers enrolled in an IP video conferencing network service. When a customer requests enrollment in the IP video conferencing network service, various systems for provisioning and configuring the network that provide the network service set-up and configure various nodes in the network such that the various nodes may provide the IP video conferencing network service to the customer over a VPN and private IP network used by the customer. The customer may engage in a conference call with another customer on another VPN on another private IP network using the VPN to VPN bridging of the IP video conferencing network service described herein.

Figure 1A:
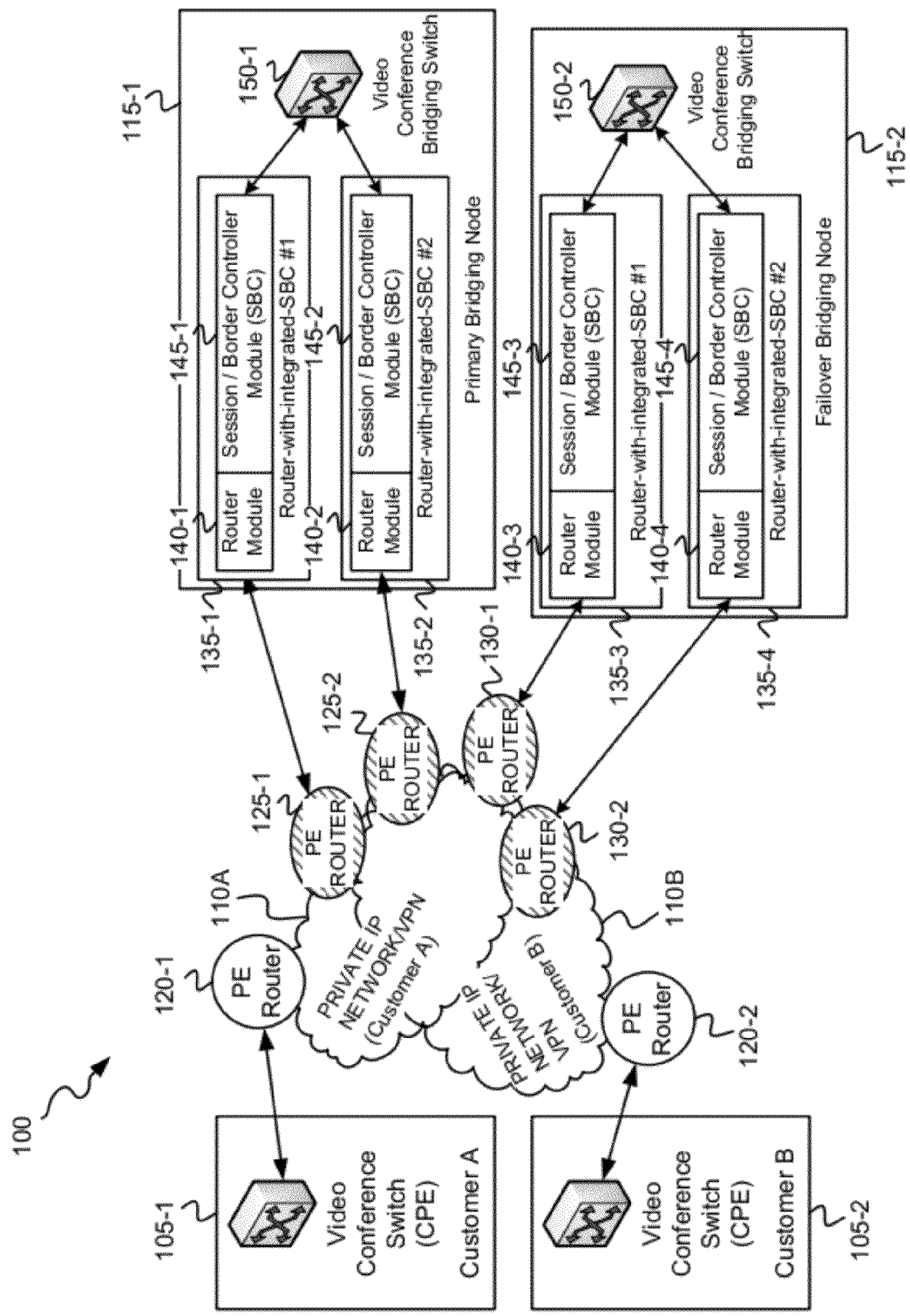
FIG. 1A is a diagram that depicts an exemplary network environment in which a network service may provide Internet Protocol (IP) video conferencing between customers which are each connected to a different private IP network.

FIG. 1A is a diagram that depicts an exemplary network environment in which a network service may provide Internet Protocol (IP) video conferencing between customers connected to their own, separate private IP networks. As shown in FIG. 1A, a network 100 that provides IP video conferencing may include customers 105-1 and 105-2 (referred to generically herein as "customer 105"), private networks 110A (for customer A) and 110B (for customer B), and bridging nodes 115-1 and 115-2. Private networks 110A and 110B may include, as shown in FIG. 1A, multiple Provider Edge (PE) routers which interconnect private networks 110A and 110B with customers 105-1 and 105-2, and with bridging nodes 115-1 and 115-2. As shown in FIG. 1A, PE router 120-1 interconnects with customer 105-1 and PE router 120-2 interconnects with customer 105-2. As further shown in FIG. 1A, PE routers 125-1 and 125-2 interconnect with primary bridging node 115-1 and PE routers 130-1 and 130-2 interconnect with failover bridging node 115-2. Private networks 110A and 110B may, as shown in FIG. 1A, each "share" PE routers 125-1, 125-2, 130-1 and 130-2. Therefore, PE routers 125-1, 125-2, 130-1 and 130-2 may each reside on both of private networks 110A and 110B.

Private IP networks 110A and 110B may each include a network that uses a private IP address space and which is designed for providing IP video communication for customers 105-1 and 105-2. Private IP networks 110A and 110B may each implement different Virtual Private Networks (VPNs) for providing IP video communication between the customers. For example, a different VPN may be used by each customer for IP video communication. As an example, customer A may use VPN1 for IP video communication over private IP network 110A and customer B may use VPN2 for IP video communication over private IP network 110B. Exemplary embodiments described herein permit the interconnection of different VPNs, associated with different customers, for supporting IP video conferencing.

Primary bridging node 115-1 may include two router-with-integrated-session/border controllers (SBCs) 135-1 and 135-2 and a video conference bridging switch 150-1. Router-with-integrated-SBC 135-1 may include a router module 140-1 and a SBC 145-1. Router-with-integrated-SBC 135-2 may include a router module 140-2 and a SBC 145-2.

Failover bridging node 115-2 may include two router-with-integrated-SBCs 135-3 and 135-4 and a video conference bridging switch 150-2. Router-with-integrated-SBC 135-3 may include a router module 140-3 and a SBC 145-3. Router-with-integrated-SBC 135-4 may include a router module 140-4 and a SBC 145-4.

Video conference bridging switches 150-1 and 150-2 may bridge multiple video calls from customers together into a single video conference call, thus enabling the customers to exchange video traffic with one another. Router module 140 and SBC 145 in each bridging node 115 may operate to route video traffic to/from a respective video conference bridging switch 150, thereby establishing a video conference between customers 105-1 and 105-2.

The configuration of components of network 100 illustrated in FIG. 1A is for illustrative purposes only. Other configurations may be implemented. Therefore, network 100 may include additional, fewer and/or different components than those depicted in FIG. 1A.

Figure 1B:
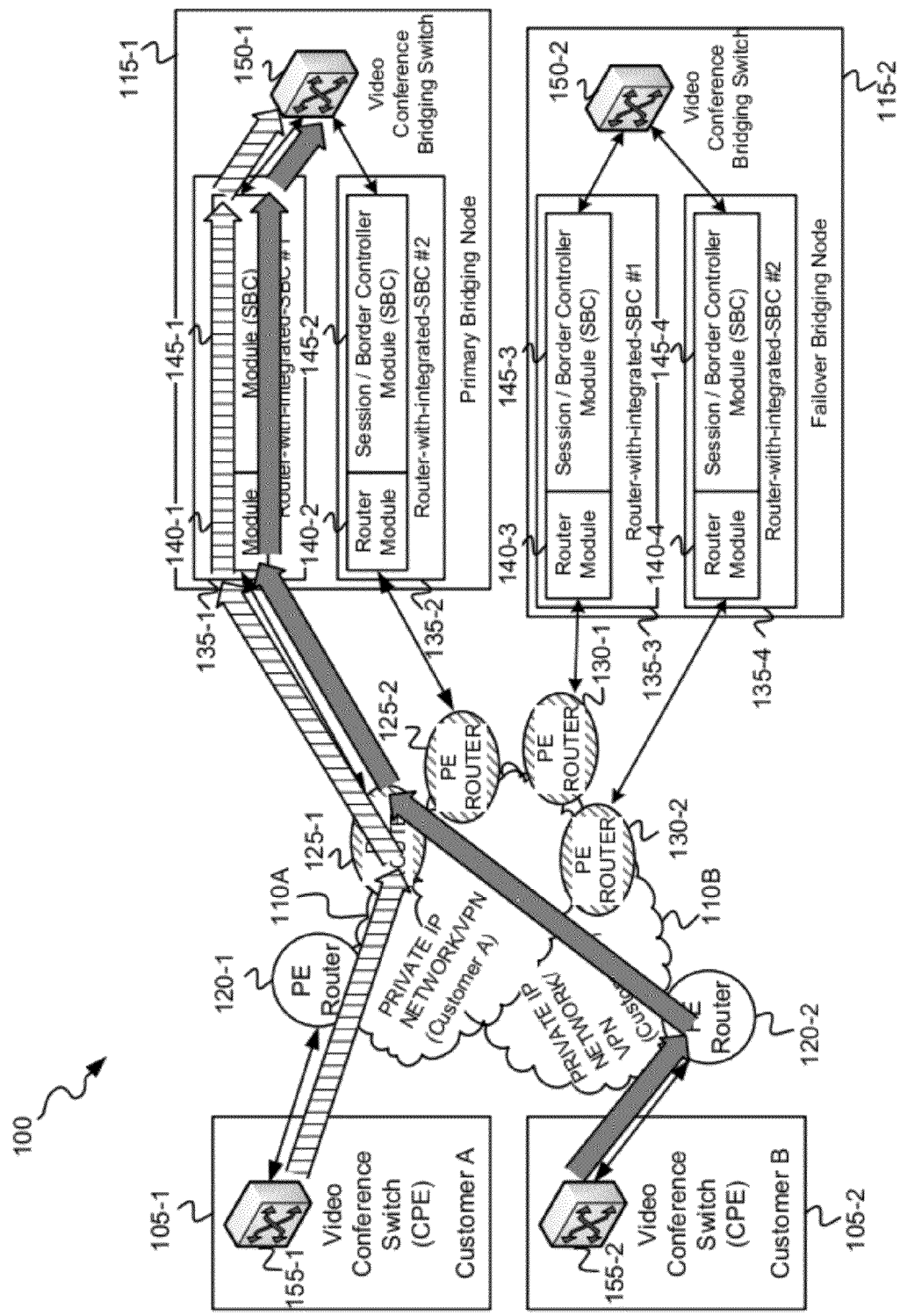
FIG. 1B is a diagram that depicts an example of the implementation of IP video conferencing involving the customers of FIG. 1A.

FIG. 1B depicts an example of the implementation of IP video conferencing involving customers 105-1 and 105-2. Using a video conference switch 155-1, customer A 105-1 may attempt to connect a video conference call with customer B 105-2 via network 100. As shown in FIG. 1B, customer A 105-1's leg of the video conference call may connect through PE router 120-1 and PE router 125-1 of private IP network 110A, and through router-with-integrated-SBC 135-1 to video conference bridging switch 150-1. Customer B 105-2's leg of the video conference call may connect through video conference switch 155-2, and through PE router 120-2 and PE router 125-1 of private IP network 110B, and further through router-with-integrated-SBC 135-1 to video conference bridging switch 150-1. The video calls may be bridged together in video conference bridging switch 150-1 to enable customer's A 105-1 and B 105-2 to send and receive video traffic with one another as a single conference call.

Figure 2:
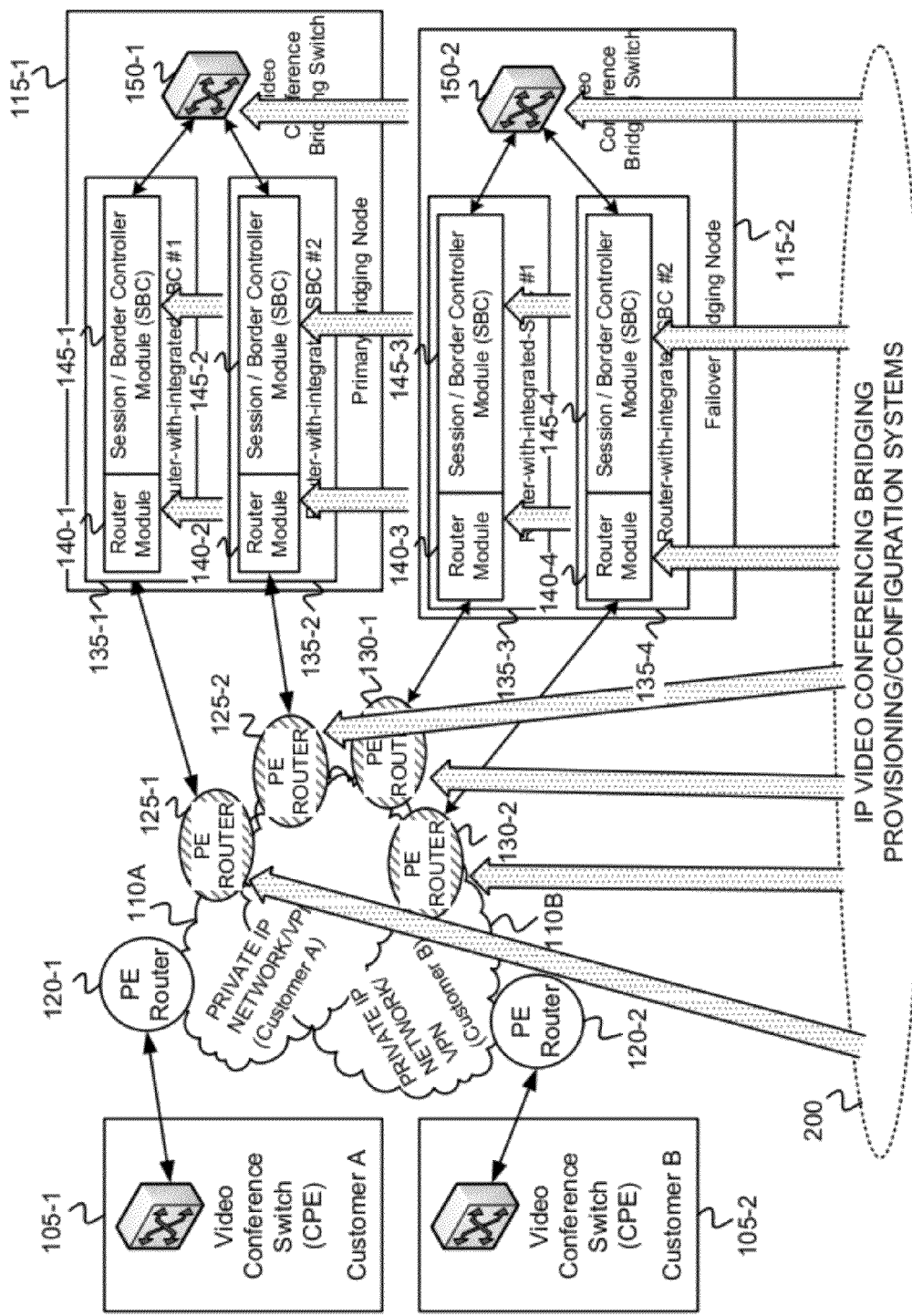
FIG. 2 is a diagram that depicts one or more IP video conferencing bridging provisioning and configuration systems connected to the network of FIG. 1A.

FIG. 2 depicts one or more IP video conferencing bridging provisioning and configuration systems 200 connected to network 100. Systems 200 may orchestrate the provisioning and configuration of network components in network 100 to enable the IP video conferencing network service to be provided to each customer. Systems 200 are depicted as provisioning/configuring (via shaded arrow) components of private IP networks 110A and 110B and components of bridging nodes 115-1 and 115-2. For example, systems 200 are depicted as provisioning/configuring PE routers 125-1, 125-2, 130-1 and 130-2. Additionally, systems 200 are depicted as provisioning/configuring each router module 140 and SBC 145 of each bridging node 115. As described in further detail below, systems 200 may connect to each of PE routers 125-1, 125-2, 130-1 and 130-2; router modules 140-1, 140-2, 140-3 and 140-4; SBCs 145-1, 145-2, 145-3 and 145-4; and video conference bridging switches 150-1 and 150-2 to variously configure these network nodes so that customers 105-1 and 105-2 may engage in IP video conferencing bridging via network 100.

Systems 200 may set-up PE routers 125-1, 125-1, 130-1 and/or 130-2 to be part of a customer's VPN when that customer requests IP video conferencing bridging service. Systems 200 may further set-up Permanent Virtual Circuits (PVCs) between PE router 125-1 and router module 140-1, between PE router 125-2 and router module 140-2, between PE router 130-1 and router module 140-3 and between PE router 130-2 and router module 140-4. Systems 200 may additionally configure routing patterns (e.g., where to forward different calls to) in each video conference bridging switch 150.

Figure 3:
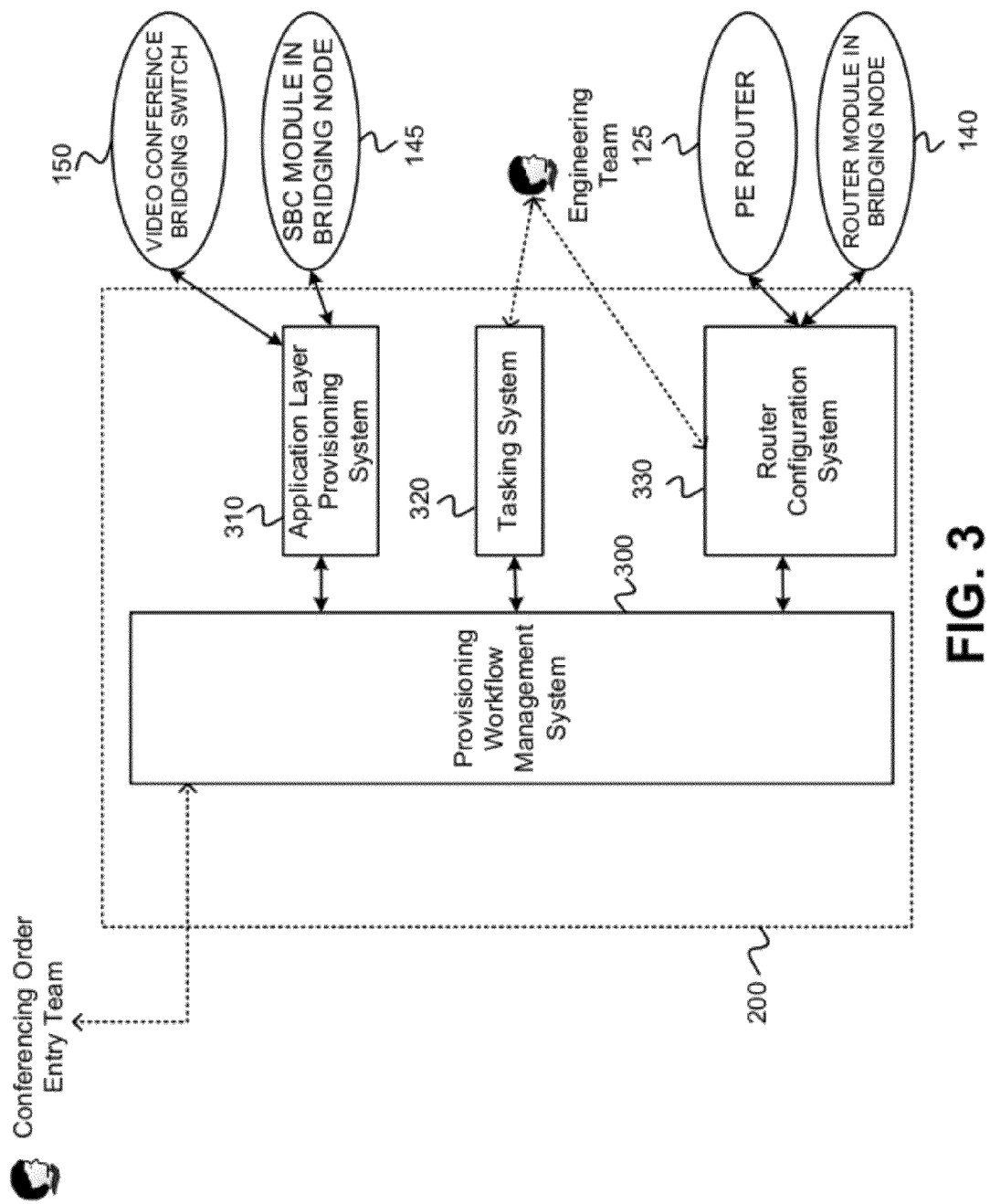
FIG. 3 is a diagram that depicts exemplary system components of the IP video conferencing bridging provisioning/configuration systems of FIG. 2.

FIG. 3 is a diagram that depicts exemplary system components of IP video conferencing bridging provisioning/configuration systems 200. Systems 200 may include a provisioning workflow management system 300, an application layer provisioning system 310, a tasking system 320, and a router configuration system 330.

Provisioning workflow management system 300 may receive new service orders associated with customers requesting enrollment in the IP video conferencing network service. The new service orders may include service order information, such as, for example, a name of the customer's private IP network, and the customer's VPN. The new service orders may be received, for example, from a provisioning administrator (admin). Provisioning workflow management system 300 may additionally query router configuration system 330 for information about the customer's existing VPN. Provisioning workflow management system 300 may orchestrate the provisioning/configuration of various components involved in providing the IP video conferencing network service to customers. Upon receipt of service order information from the provisioning administrator or from router configuration system 330, provisioning workflow management system 300 may trigger the configuration of PE routers 125-1, 125-2, 130-1 and/or 130-2, and router modules 140. Once router configuration is complete, provisioning workflow management system 300 may trigger application layer provisioning system 310 to configure SBC modules 145 and video conference bridging switches 150.

Application layer provisioning system 310 may, upon receiving a trigger from provisioning workflow management system 300, configure SBC modules 145-1, 145-2, 145-3 and/or 145-4 in selected bridging nodes 115. Application layer provisioning system 310 may further trigger customer-specific configuration of video conference bridging switch 150 in bridging node 115. Upon completion of configuring the SBC modules and the video conference bridging switch, application layer provisioning system 310 may send a final, completion milestone to provisioning workflow management system 300. Configuration of SBC modules 145-1, 145-2, 145-3 and/or 145-4 may include configuring the SBC modules to connect them to video conference bridging switch 150. Application layer provisioning system 310 may additionally configure parameters within video conference bridging switch 150. Such parameters may include the configuration of routing patterns (e.g., where to forward each call to based on the number dialed) in each video conference bridging switch 150.

Tasking system 320 may receive work requests from provisioning workflow management system 300 that may be used by router configuration system 330 and application layer provisioning system 310 in configuring the routers, SBC modules, and video conference bridging switch. The work requests may include network attribute parameters from the service order information. Router configuration system 330 may configure PE routers 125-1, 125-2, 130-1 and/or 130-2, and router modules 140, based on the work request stored at tasking system 320 and based on engineering team input. An engineering team may use the stored work requests to assist in the router configuration performed by router configuration system 330. Alternatively, systems 200 may automatically configure PE routers 125 and 130 based on the work request. Configuration of PE routers 125-1, 125-2, 130-1 and/or 130-2 may configure the routers to be part of the customer's VPN. Configuration of router modules 140 may include configuring the router modules to connect to a corresponding PE router (e.g., router module 140-1 to PE router 125-1, router module 140-2 to PE router 125-2, etc.).

The configuration of system components of systems 200 illustrated in FIG. 3 is for illustrative purposes only. Other configurations may be implemented. Therefore, systems 300 may include additional, fewer and/or different system components than those depicted in FIG. 3.

Figure 4:
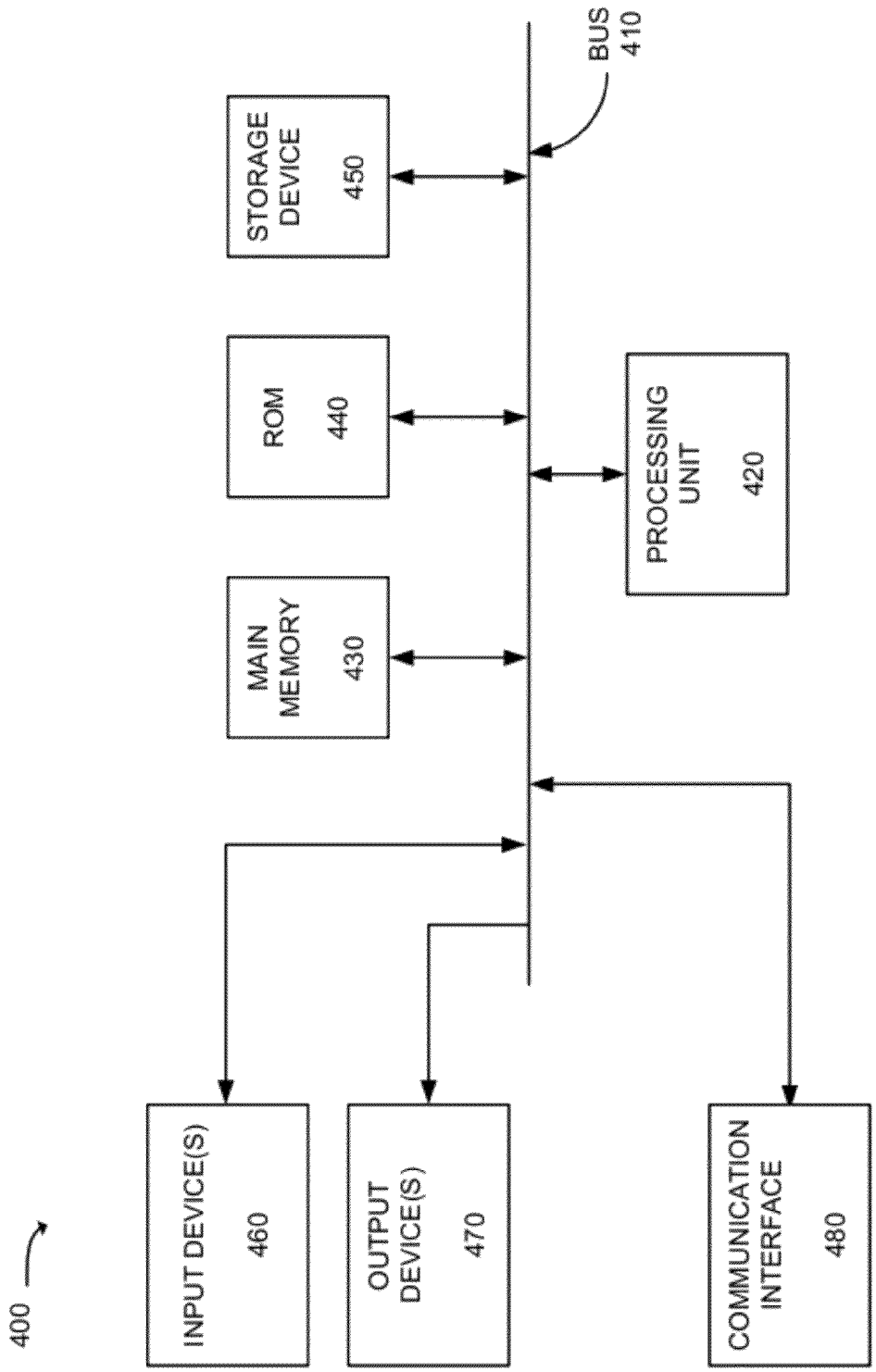
FIG. 4 is a diagram that depicts exemplary components of a system, which may correspond to any one of the IP video conferencing bridging provisioning/configuration systems of FIG. 2.

FIG. 4 is a diagram that depicts exemplary components of a system 400, which may correspond to any one of the systems 200. System 400 may correspond to provisioning workflow management system 300, application layer provisioning system 310, tasking system 320 and/or router configuration system 330. In some implementations, systems 200 may include only a single system that implements systems 300, 310, 320 and 330 as software modules within the single system. In such implementations, provisioning workflow management system 300, application layer provisioning system 310, tasking system 320 and router configuration system 330 may each include a software module implemented by single system 400.

System 400 may include a bus 410, a processing unit 420, a main memory 430, a read only memory (ROM) 440, a storage device 450, an input device(s) 460, an output device(s) 470, and a communication interface 480. Bus 410 may include a path that permits communication among the elements of system 400. Processing unit 420 may include one or more processors or microprocessors, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to system 400, such as, for example, a keypad or a keyboard, voice recognition and/or biometric mechanisms, etc. Output device 470 may include one or more mechanisms that output information to the operator, including a display, a speaker, etc. Communication interface 480 may include any transceiver mechanism that enables system 400 to communicate with other devices and/or systems. For example, communication interface 480 may include mechanisms for communicating with via private IP networks 110A or 110B.

System 400 may perform certain operations or processes, as described herein. System 400 may perform these operations in response to processing unit 420 (or multiple processing units—not shown) executing software instructions contained in a computer-readable medium, such as memory 430. A computer-readable medium may include a physical or logical memory device. A logical memory device may include memory space within a single physical memory device or spread across multiple physical memory devices.

The software instructions may be read into main memory 430 from another computer-readable medium, such as storage device 450, or from another device via communication interface 480. The software instructions contained in main memory 430 may cause processing unit 420 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of system 400 illustrated in FIG. 4 is for illustrative purposes only. Other configurations may be implemented. Therefore, system 400 may include additional, fewer and/or different components than those depicted in FIG. 4.

Figure 5A:
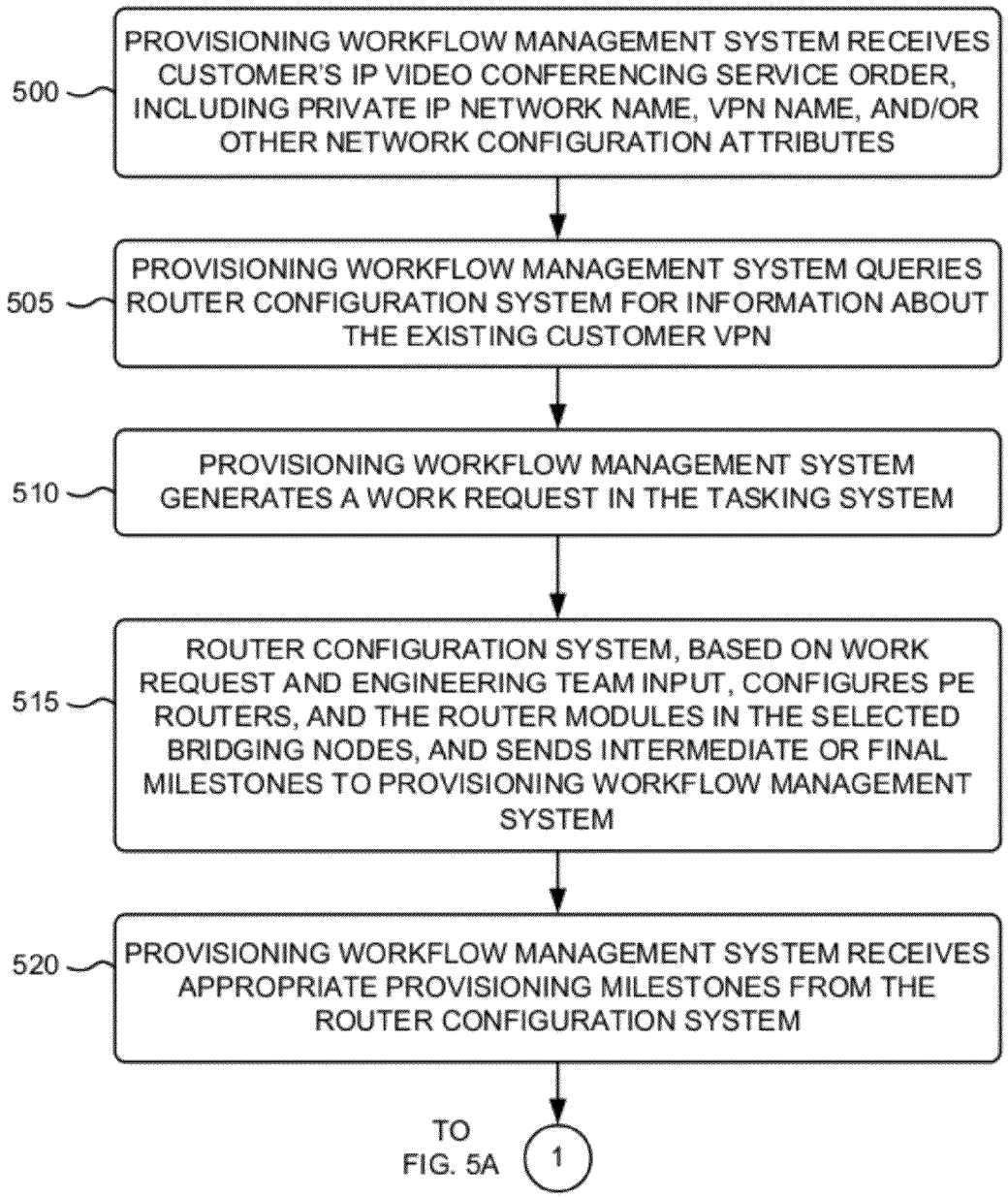
FIGS. 5A and 5B are flow diagrams that illustrate an exemplary process for provisioning/configuring components of a network to enable them to provide an IP video conferencing bridging network service to requesting customers.
Figure 5B:
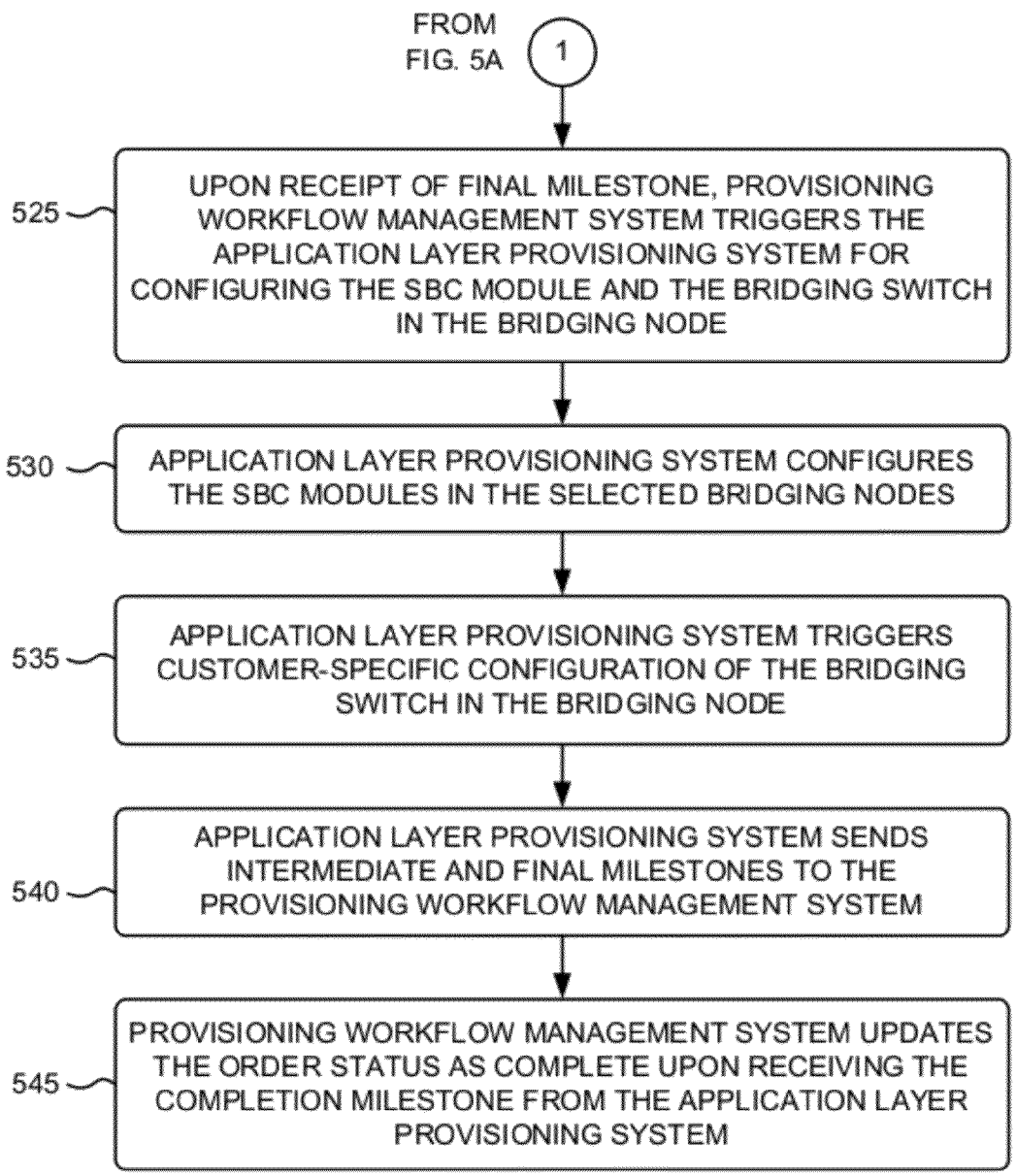

FIGS. 5A and 5B are flow diagrams that illustrate an exemplary process for provisioning/configuring components of a network to enable them to provide an IP video conferencing bridging network service to requesting customers. The exemplary process of FIGS. 5A and 5B may be implemented by components of IP video conferencing bridging provisioning/configuration systems 200. The description of the exemplary process of FIGS. 5A and 5B below may refer to the diagram of FIG. 3.

The exemplary process may include provisioning workflow management system 300 receiving a customer's IP video conferencing service order, including the customer's private IP network name, VPN name, and/or other network configuration attributes (block 500). System 300 may receive the service order from a Provisioning Administrator. The customer's private IP network name may include a name/identifier of private IP network 110A or 110B to which customer 105 is connected. The VPN name may include a name/identifier of the VPN used by the customer when connecting video conferencing calls across private IP network 110A or 110B. The other network configuration attributes contained in the service order may include a customer-preferred IP address space, an indication of a redundant connection for geo-survivability, etc. Provisioning workflow management system 300 may query router configuration system 330 for information about the existing customer VPN (block 505). Provisioning workflow management system 300 may, for example, query router configuration system 330 to validate the customer's VPN to ensure that the VPN exists and that the VPN is functioning.

Provisioning workflow management system 300 may generate a work request in tasking system 320 (block 510). The work request may include the customer's Private IP network name/identifier, VPN name/identifier, and other network attributes obtained in block 500. Router configuration system 330, based on the work request and engineering team input, may configure PE routers 125-1, 125-2, 130-1 and/or 130-2, and router modules 140 in selected bridging nodes 115, and may send intermediate or final milestones to provisioning workflow management system 300 (block 515). A bridging node of the multiple bridging nodes available for video conferencing (e.g., primary bridging node 115-1 and failover bridging node 115-2) may be selected for handling video conferencing calls from the customer associated with the service order request, and the router modules 140, and corresponding PE routers, of that bridging node 115 may be configured. Configuration of PE routers 125-1, 125-2, 130-1 and 130-2 may include setting up each PE router to be included in the customer's VPN, and setting up a Permanent Virtual Circuit (PVC) between each PE router and a corresponding router module 140. Configuration of router modules 140 may include setting up the PVC between each router module and a corresponding PE router.

Provisioning workflow management system 300 may receive appropriate provisioning milestones from router configuration system 330 (block 520). As router configuration system 330 configures PE routers 125-1, 125-2, 130-1 and/or 130-2, and router modules 140, router configuration system 330 may provide milestones (i.e., updates) that specify the current progress made in completing the configuration. Upon receipt of a final, completion milestone, provisioning workflow management system 300 may trigger application layer provisioning system 310 to configure SBC modules 145 in the selected bridging nodes and to configure video conference bridging switch 150 in the selected bridging nodes (block 525).

Application layer provisioning system 310 may configure SBC modules 145 in the selected bridging nodes (block 530). A bridging node of the multiple bridging nodes available for video conferencing (e.g., primary bridging node 115-1 and failover bridging node 115-2) may be selected for handling video conferencing calls from the customer associated with the service order request, and the SBC modules 145 of that bridging node 115 may be configured. Each SBC module 145 being configured may have its connection with video conference bridging switch 150 set-up and configured. Application layer provisioning system 310 may trigger customer-specific configuration of video conference bridging switch 150 in bridging node 115 (block 535). The customer-specific configuration of video conference bridging switch 150 may include the configuration of routing patterns (e.g., where to forward each call to based on the dialed telephone number) for each customer. A conference call may be established by dialing a non-public, telephone-like number. Depending on the telephone number dialed, switch 150 in bridging node 115 may decide where to forward the call to. If multiple conferencing locations of a customer have similar numbers, then one can specify a dialing pattern instead of the individual end-point telephone phone numbers in bridging switch 150. The destination Enterprise-side switch may be determined based on the dialing pattern of the dialed telephone number.

Application layer provisioning system 310 may send intermediate and final milestones to provisioning workflow management system 300 (block 540). As application layer provisioning system 310 configures SBC modules 145 and video conference bridging switches 150, application layer provisioning system 310 may provide milestones (i.e., updates)

that specify the current progress made in completing the configuration. Provisioning workflow management system 300 may update the order status as complete upon receiving the final, completion milestone from application layer provisioning system 310 (block 545). At this point, IP video conferencing between customer 105-1 and 105-2 may proceed.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A and 5B, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A router configuration system, comprising:
    a transceiver configured to receive a work request associated with a service order, wherein the service order requests enrollment of a customer in a Virtual Private Network (VPN) to VPN bridging network service for Internet Protocol (IP) video conferencing; and
    a processing unit, comprising one or more processors or microprocessors, or processing logic, configured to:
        retrieve network attributes associated with a private IP network used by the customer from the work request, wherein the private IP network includes a provider edge (PE) router, and a bridging node is connected to the private IP network via the PE router, wherein the bridging node comprises a router module and a session-border controller module, and
        configure multiple routers involved in providing the VPN to VPN bridging network service for IP video conferencing via the private IP network based on the network attributes, wherein, when configuring the multiple routers, the processing unit is further configured to:
        configure the PE router to be part of a Virtual Private Network (VPN) of the customer; and
        configure the PE router and the router module to set up a Permanent Virtual Circuit (PVC) between the PE router and the router module.

2. The router configuration system of claim 1, wherein the configuration of the multiple routers enables IP video conferencing calls to be made from the customer on the VPN on the private IP network to another customer on a second VPN on a second private IP network.

3. The router configuration system of claim 1, wherein the service order includes an identifier associated with the customer's Private IP network and an identifier of the customer's Virtual Private Network (VPN).

4. The router configuration system of claim 1, wherein, when configuring the multiple routers, the processing unit is further configured to:
    configure at least one of the multiple routers to set up a Permanent Virtual Circuit (PVC) with a routing module in a bridging node.

5. The router configuration system of claim 1, wherein, when configuring the multiple routers, the processing unit is further configured to:
    configure at least one of the multiple routers to be part of the customer's Virtual Private Network (VPN).

6. A computer-implemented method, comprising:
    receiving a service order associated with a customer, wherein the service order requests enrollment of the customer in a Virtual Private Network (VPN) to VPN bridging network service for Internet Protocol (IP) video conferencing; and
    orchestrating, based on the service order, configuration of multiple network nodes in a network that provides the VPN to VPN bridging network service for IP video conferencing to the customer to enable IP video conferencing calls to be made from the customer via the network,
    wherein the network comprises a Private IP network having a provider edge (PE) router, and a bridging node, wherein the bridging node comprises a router module and a session-border controller module, and
    wherein orchestrating the configuration of the multiple network nodes comprises:
        configuring the PE router to be part of a Virtual Private Network (VPN) of the customer; and
        configuring the PE router and the router module to set up a Permanent Virtual Circuit (PVC) between the PE router and the router module.

7. The computer-implemented method of claim 6, wherein the orchestration of the multiple network nodes in the network enables IP video conferencing calls to be made from the customer on the VPN via the network to another customer on a second VPN.

8. The computer-implemented method of claim 6, wherein the service order includes the customer's Private IP network name and a name associated with the customer's Virtual Private Network (VPN).

9. The computer-implemented method of claim 8, wherein orchestrating the configuration of the multiple network nodes comprises:
    configuring one or more routers of the network to be part of the customer's Virtual Private Network (VPN).

10. The computer-implemented method of claim 6, wherein orchestrating the configuration of the multiple network nodes comprises:
    configuring one of the multiple routers to set up a Permanent Virtual Circuit (PVC) with a router module in a bridging node.

11. A non-transitory computer-readable medium containing instructions executable by at least one processing unit, the non-transitory computer-readable medium comprising:
    one or more instructions for receiving a work request associated with a service order of a customer, wherein the service order requests enrollment of the customer in a Virtual Private Network (VPN) to VPN bridging network service for Internet Protocol (IP) video conferencing;

one or more instructions for retrieving network attributes associated with a private IP network used by the customer, wherein the private IP network includes a provider edge (PE) router, and a bridging node is connected to the private IP network via the PE router, wherein the bridging node comprises a router module and a session-border controller module;

one or more instructions for configuring multiple routers involved in providing the VPN to VPN bridging network service for IP video conferencing via the private IP network based on the network attributes;

one or more instructions for configuring the PE router to be part of a Virtual Private Network (VPN) of the customer; and one or more instructions for configuring the PE router and the router module to set up a Permanent Virtual Circuit (PVC) between the PE router and the router module.

12. The non-transitory computer-readable medium of claim 11, wherein the one or more instructions for configuring the multiple routers involved in providing the VPN to VPN bridging network service enables IP video conferencing calls to be made from the customer on the VPN on the private IP network to another customer on a second VPN on a second private IP network.

13. The non-transitory computer-readable medium of claim 11, wherein the one or more instructions for configuring the multiple routers further comprise:

one or more instructions for configuring at least one of the multiple routers to set up a Permanent Virtual Circuit (PVC) with a router module in a bridging node.

14. The non-transitory computer-readable medium of claim 11, wherein the one or more instructions for configuring the multiple routers further comprise:

one or more instructions for configuring at least one of the multiple routers to be part of the customer's Virtual Private Network (VPN).

15. The non-transitory computer-readable medium of claim 11, wherein the service order includes an identifier associated with the customer's Private IP network and an identifier associated with the customer's Virtual Private Network (VPN).

* * * * *